(12) United States Patent
Kim

(10) Patent No.: US 9,809,086 B2
(45) Date of Patent: Nov. 7, 2017

(54) METHOD AND SYSTEM FOR CONTROLLING VEHICLE RADIATOR FLAP

(71) Applicant: Hyundai Motor Company, Seoul (KR)

(72) Inventor: Shin Hae Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 326 days.

(21) Appl. No.: 14/563,804

(22) Filed: Dec. 8, 2014

(65) Prior Publication Data

US 2015/0322844 A1 Nov. 12, 2015

(30) Foreign Application Priority Data

May 9, 2014 (KR) ........................ 10-2014-0055241

(51) Int. Cl.
- *F01P 7/14* (2006.01)
- *B60R 16/023* (2006.01)
- *B60H 1/00* (2006.01)

(52) U.S. Cl.
CPC ..... *B60H 1/00864* (2013.01); *B60R 16/0231* (2013.01); *F01P 7/14* (2013.01); *F01P 2007/146* (2013.01)

(58) Field of Classification Search
CPC ........ F01P 7/02; F01P 7/06; F01P 7/10; F01P 1/00; F01P 1/06; F01P 2025/04; F01P 2025/08; F01P 2025/13; F01P 2025/50; F01P 2025/34; F01P 2025/36; F01P 2025/66; B60H 1/00864; B60H 1/00821; B60H 1/00871; B60H 1/00878; B60R 16/0231

See application file for complete search history.

(56) References Cited

U.S. PATENT DOCUMENTS

| | | | | |
|---|---|---|---|---|
| 4,475,485 A | * | 10/1984 | Sakakibara | F01P 7/026 123/41.05 |
| 5,566,745 A | * | 10/1996 | Hill | B61C 5/02 105/62.2 |
| 8,833,313 B2 | * | 9/2014 | Lockwood | B60K 11/085 123/41.04 |

(Continued)

FOREIGN PATENT DOCUMENTS

| | | |
|---|---|---|
| JP | 2000-170534 A | 6/2000 |
| KR | 10-2004-0022964 A | 3/2004 |

(Continued)

*Primary Examiner* — Grant Moubry
(74) *Attorney, Agent, or Firm* — Mintz Levin Cohn Ferris Glovsky and Popeo, P.C.; Peter F. Corless

(57) ABSTRACT

The present invention provides a system & method for controlling a radiator flap for a vehicle, which are capable of effectively operating of a cooling fan and a radiator flap simultaneously consequently by opening & closing the radiator flap by a combination of a cooling fan control signal related to control of the cooling fan and a vehicle CAN signal related to vehicle state information, such as a vehicle speed. The system includes: an engine controller that is configured to generate a cooling fan control signal. In addition, an integrated controller is configured to detect an engine coolant temperature based on the cooling fan control signal, and detect one or more of vehicle speed information, on/off information of an air conditioner switch, and air conditioner refrigerant pressure information based on a vehicle CAN signal to open and close the radiator flap.

20 Claims, 8 Drawing Sheets

(56) References Cited

U.S. PATENT DOCUMENTS

2011/0281515 A1* 11/2011 Lockwood ................ F01P 7/12
                                                               454/75
2013/0046445 A1* 2/2013 Nishimura ........... B60H 1/3208
                                                               701/49

FOREIGN PATENT DOCUMENTS

| KR | 10-2005-0062051 A | 6/2005 |
| KR | 10-2008-0032729 A | 4/2008 |
| KR | 10-2010-0061161 A | 6/2010 |
| KR | 10-2011-0026845 A | 3/2011 |
| KR | 10-2013-0023448 A | 3/2013 |
| KR | 10-2013-0053993 A | 5/2013 |

* cited by examiner

METHOD AND SYSTEM FOR CONTROLLING VEHICLE RADIATOR FLAP

CROSS-REFERENCE TO RELATED APPLICATION

This application claims priority, under 35 U.S.C. §119(a), to Korean Patent Application No. 10-2014-0055241 filed on May 9, 2014, the entire contents of which are incorporated herein by reference.

BACKGROUND (a) Technical Field

The present disclosure relates to a system for controlling a radiator flap of a vehicle. More particularly, it relates to a system for controlling a radiator flap of a vehicle which simplifies the opening and closing of a radiator flap to reduce manufacturing cost and expand use to a wider range of vehicles.

(b) Background Art

As oil price rises and air pollution and global warming grow as a global problem, a considerable amount of attention has focused on increasing fuel efficiency of a vehicle. The fuel efficiency of vehicles has been improved using a number of different methods. One method involves using an electric motor or a fuel cell instead of traditional petroleum gasoline. Other possible methods involve improving fuel efficiency of an existing internal combustion engine or reducing air resistance while driving. Among these methods, the reducing of air resistance includes mounting a controllable radiator flap to a front surface of a vehicle and controlling a speed of a cooling fan, which improve fuel efficiency by maintaining an appropriate temperature within an engine.

The cooling fan controls a speed by receiving a speed signal from an engine management system (EMS) by a pulse width modulation (PWM) control, and the radiator flap, or an active air flap (AAF), uses an actuator capable of controlling the opening and closing of the radiator flap. Accordingly, the existing technology of controlling the cooling fan and the radiator flap is applied to luxury or environmentally-friendly vehicles due to substantial manufacturing costs. Further, the technology used to control the radiator flap is more complex than the technology used to control the cooling fan, so the radiator flap and the cooling fan are controlled separately.

The radiator flap is generally installed between a bumper and a radiator at a front part of the vehicle and can be opened and closed as needed. When the flap is closed, an air resistance coefficient decreases, causing air resistance to decrease thus improving fuel efficiency. When travelling at a substantially high speed and the flap remains closed to improve fuel efficiency, a temperature of a coolant of an engine and a main component disposed within the engine increases. When the temperature of the coolant and the main component increase to a predetermined value, or greater, the flap opens to decrease the temperature within the engine. Therefore, when the temperature of the coolant of the engine is relatively high, the radiator flap opens to reduce the temperature of the coolant. Alternatively, when the temperature of the coolant of the engine is relatively low, the radiator flap closes to reduce air resistance.

The above information disclosed in this section is merely for enhancement of understanding of the background of the invention and therefore it may contain information that does not form the prior art that is already known in this country to a person of ordinary skill in the art.

SUMMARY

An objective of the present invention provides a system for controlling a radiator flap for a vehicle, which may be capable of effectively controlling operations of a cooling fan and a radiator flap by controlling the opening and closing of the radiator flap by a cooling fan control signal and a vehicle control area network (CAN) signal regarding vehicle information, such as a vehicle speed.

In accordance with one aspect of the present invention, a system for controlling a radiator flap for a vehicle, may include: an engine controller configured to generate a cooling fan control signal based on vehicle information; and an integrated controller configured to predict and detect an engine coolant temperature based on the cooling fan control signal. Further, the integrated controller may be configured to detect at least one of a vehicle speed, an air conditioner on/off signal, and an air conditioner refrigerant pressure.

In an exemplary embodiment, the engine controller may be configured to generate the cooling fan control signal based on at least one of the vehicle speed, an engine coolant temperature, the air conditioner on/off signal, the air conditioner refrigerant pressure, and an ambient temperature. Further, the integrated controller may be configured to operate a cooling fan based on the cooling fan control signal.

In another exemplary embodiment, when the integrated controller determines that a vehicle speed is less than a first predetermined vehicle speed and the cooling fan control signal received from the engine controller maintains a cooling fan duty ratio with a first duty ratio and adjusts the first duty ratio to at least a second predetermined duty ratio, the integrated controller may be configured to open the radiator flap.

In yet another exemplary embodiment, when the integrated controller determines that the vehicle is in a high speed mode, when the vehicle speed is equal to or greater than a second predetermined vehicle speed, and the cooling fan control signal uniformly maintains a cooling fan duty ratio with a first predetermined duty ratio and adjusts the first predetermined duty ratio to at least a fifth predetermined duty ratio, the integrated controller may be configured to open the radiator flap before the cooling fan duty ratio is adjusted to the fifth predetermined duty ratio.

Further, when the air conditioner switch is on (e.g., in an on state), an air conditioner refrigerant pressure is less than a first predetermined pressure, and a vehicle speed is equal to or greater than a first predetermined vehicle speed and the integrated controller determines that the cooling fan control signal uniformly maintains a cooling fan duty ratio with a first predetermined duty ratio and adjusts the first duty ratio to at least a ninth predetermined duty ratio, the integrated controller may be configured to open the radiator flap.

When the integrated controller determines that the vehicle is in a slow air conditioner mode, and the cooling fan control signal adjusts a cooling fan duty ratio from a first duty ratio to at least a fourth predetermined duty ratio, the integrated controller may be configured to open the radiator flap.

In addition, when the air conditioner switch is on, the air conditioner refrigerant pressure is at least a first predetermined pressure and is less than a second predetermined pressure, the vehicle speed is equal to or greater than a first predetermined vehicle speed, and when the integrated controller determines that the cooling fan control signal maintains a duty ratio of a cooling fan with a third predetermined duty ratio, the integrated controller may be configured to adjust the third predetermined duty ratio to a first predetermined duty ratio. The integrated controller may also be configured to adjust the first predetermined duty ratio to at least a fourth predetermined duty ratio. The integrated controller may then be configured to open the radiator flap.

In another further exemplary embodiment, when the air conditioner switch is on, the air conditioner refrigerant pressure is at least a first predetermined pressure and is less than a second predetermined pressure, the vehicle speed is less than a first predetermined vehicle speed and at most a second vehicle speed, and the integrated controller determines that the cooling fan control signal maintains a cooling fan duty ratio with a first predetermined duty ratio and adjusts the first predetermined duty ratio to at least a fourth predetermined duty ratio, the integrated controller may be configured to open the radiator flap.

When the air conditioner switch is on, the air conditioner refrigerant pressure is at least a first predetermined pressure and is less than a second predetermined pressure, the vehicle speed is at least a second predetermined vehicle speed, and the integrated controller determines that the cooling fan control signal maintains a cooling fan duty ratio with a first predetermined duty ratio and adjusts the first predetermined duty ratio to at least a fifth predetermined duty ratio, the integrated controller may be configured to open the radiator flap.

When the integrated controller determines that the vehicle enters a safe mode, when the vehicle speed is at least a third predetermined vehicle speed, through a vehicle CAN signal, and that the cooling fan control signal adjusts a duty ratio of a cooling fan from a first predetermined duty ratio to at least a fifth predetermined duty ratio, the integrated controller may be configured to open the radiator flap.

According to a system for controlling the radiator flap for a vehicle according to the present invention, performance and marketability may be improved, manufacturing cost may be decreased, use of the present invention may be expanded to a wider range of vehicles, and engine heat damage due to a system failure may be prevented by simplifying opening and closing of the radiator flap.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
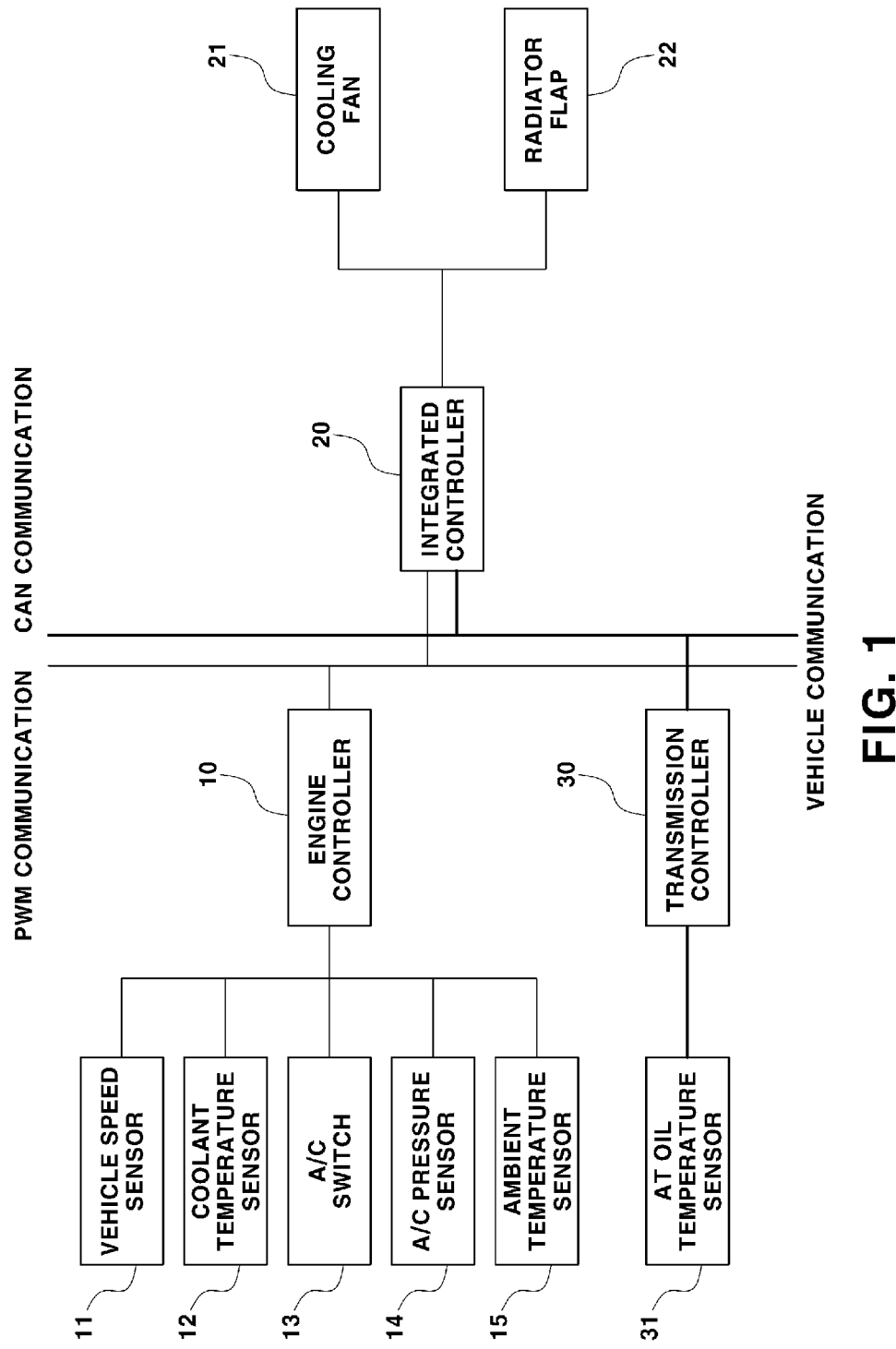
FIG. 1 is an exemplary diagram for describing a system for controlling a radiator flap for a vehicle according to an exemplary embodiment of the present invention.

Reference numerals set forth in the Drawings include reference to the following elements as further discussed below:

10: Engine controller
11: Vehicle speed sensor
12: Coolant temperature sensor
13: Air conditioner switch
14: Air conditioner refrigerant pressure sensor
15: Ambient temperature sensor
20: Integrated controller
21: Cooling fan
22: Radiator flap
30: Transmission controller
31: Oil temperature sensor It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In accordance with an exemplary embodiment of the present invention, the opening & closing of a radiator flap may be controlled based on an analysis result of a cooling fan control signal. An engine controller may be configured to generate the cooling fan control signal.

A system for controlling a radiator flap for a vehicle according to an exemplary embodiment of the present invention may control the opening & closing of a radiator flap based on a cooling fan control signal, and, referring to FIG. 1, and may include an engine controller 10 configured to generate the cooling fan control signal, and an integrated controller 20 configured to execute opening & closing of the radiator flap 22 according to a result of a cooling fan control signal analysis.

The engine controller 10 may be configured to receive a signal (vehicle information) generated by a vehicle speed sensor 11, a coolant temperature sensor 12, an air conditioner switch 13, an air conditioner refrigerant pressure sensor 14, an ambient temperature sensor 15, and the like, which may be disposed within the vehicle, and may be configured acquire base information (vehicle information) for controlling an operation of a cooling fan. The vehicle speed sensor 11 may be configured to detect a vehicle speed and provide the engine controller 10 with a vehicle speed. The coolant temperature sensor 12 may be configured to detect an engine coolant temperature and provide the engine controller 10 with the engine coolant temperature. The air conditioner switch 13 may provide the engine controller 10 with an air conditioner on/off signal. The air conditioner refrigerant pressure sensor 14 may be configured to detect an air conditioner refrigerant pressure and provide the engine controller 10 with the refrigerant pressure. The ambient temperature sensor 15 may be configured to detect an ambient temperature of an engine room and provide the engine controller 10 with the ambient temperature. The engine controller 10 may also be configured to generate a cooling fan control signal based on at least one of the vehicle speed, the engine coolant temperature, the air conditioner on/off signal, the air conditioner refrigerant pressure, and the ambient temperature.

The integrated controller 20 may be configured to analyze the cooling fan control signal received from the engine controller 10 and recognize an engine coolant temperature variation of the engine coolant temperature. The integrated controller may further be configured to operate an opening/closing operation of the radiator flap 22 based on a result of the analysis. The integrated controller may be configured to simultaneously operate a cooling fan 21 and the opening & closing of the radiator flap 22 based on the cooling fan control signal. In particular, the engine controller 10 may be configured to transmit the cooling fan control signal to the integrated controller 20 via pulse width modulation (PWM) communication, and the cooling fan control signal, which may be a cooling fan duty signal generated by a PWM control method, may be used for adjusting a speed of the cooling fan 21.

The integrated controller 20 may be configured to use vehicle information (e.g., a vehicle CAN signal) transmitted via control area network (CAN) communication in addition to the cooling fan control signal during the operation of the opening & closing of the radiator flap 22. Particularly, the integrated controller 20 may be configured to predict and detect an engine coolant temperature based on the cooling fan control signal. The integrated controller 20 may also be configured to determine the vehicle speed, the air conditioner on/off signal, the air conditioner refrigerant pressure, and the like based on the vehicle CAN signal to execute the opening/closing of the radiator flap 22. The CAN signal may be directly transmitted from each sensor and may also be transmitted through the engine controller 10.

Figure 2:
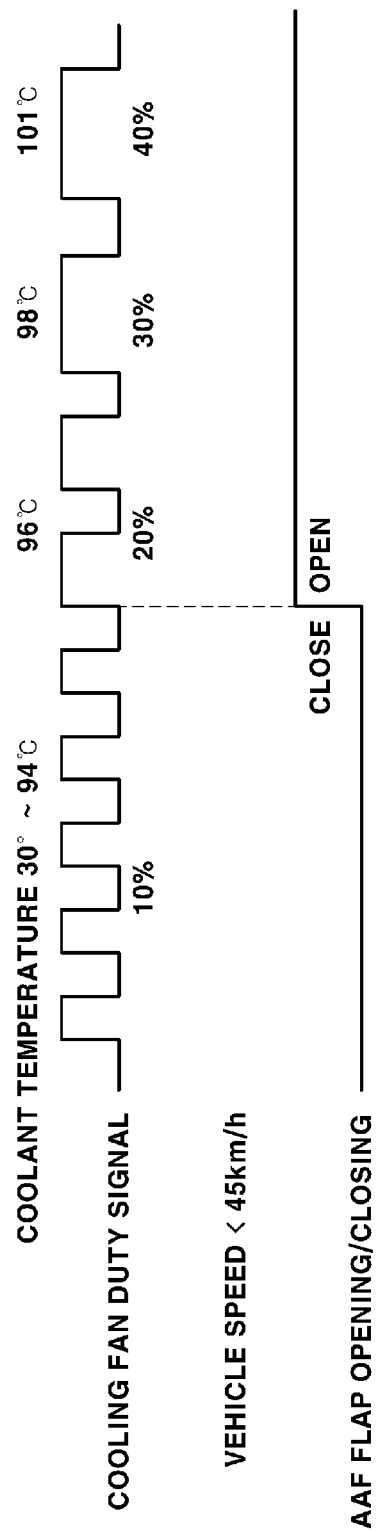
FIGS. 2 to 8 are exemplary diagrams for describing a method of controlling opening/closing of the radiator flap for the vehicle according to an exemplary embodiment of the present invention.

Hereinafter, an example of a radiator flap operation in association with the cooling fan control signal will be described with reference to FIGS. 2 to 8. When the engine coolant temperature increases from about 94° C. to about 96° C. or greater when the vehicle travels at less than a first predetermined vehicle speed (e.g., about 45 km/h), the engine controller 10 may be configured to generate a cooling fan control signal for adjusting a cooling fan duty ratio, which may be maintained at a first predetermined duty ratio (e.g., about 10%), to a second predetermined duty ratio (e.g., about 20%). Referring to FIG. 2, when the cooling fan control signal (or the cooling fan duty signal) is uniformly maintained at the first predetermined duty ratio (e.g., about 10%), and then is adjusted to the second predetermined duty ratio (e.g., about 20%), the engine coolant temperature is adjusted from about 94° C. to at least about 96° C. In other words, when the engine coolant temperature is adjusted from about 94° C. to about 96° C. or greater, the cooling fan duty ratio may be uniformly maintained at the first predetermined duty ratio and adjusted to the second predetermined duty ratio, and the integrated controller 20 may be configured to determine such an engine coolant temperature variation through the cooling fan control signal.

Accordingly, when the cooling fan duty ratio may be adjusted to the second predetermined duty ratio in response to the cooling fan control signal analysis (cooling fan duty signal), the integrated controller 20 may be configured to open the radiator flap. Further, when the cooling fan duty ratio is maintained at the second predetermined duty ratio or greater, the integrated controller 20 may be configured to maintain the radiator flap open. In particular, the second predetermined duty ratio may be greater by a predetermined value than the first predetermined duty ratio, and may have a value two times greater than the first duty ratio.

When the vehicle speed is less than the first predetermined vehicle speed, the engine controller 10 may be configured to adjust the cooling fan duty ratio with the first predetermined duty ratio (e.g., about 10%) when the engine coolant temperature information obtained from the coolant temperature sensor 12 is within a range of from about 30° C. to about 94° C. The engine controller 10 may also be configured to adjust the cooling fan duty ratio to the predetermined second duty ratio (e.g., about 20%) when the engine coolant temperature is about 96° C. The engine controller 10 may be configured to adjust the cooling fan duty ratio to a predetermined third duty ratio (e.g., about 30%) when the engine coolant temperature is about 98° C.

In addition, the engine controller 10 may be configured to adjust the cooling fan duty ratio to a fourth predetermined duty ratio (e.g., about 40%) when the engine coolant temperature information is about 101° C.

Furthermore, when the engine coolant temperature increases from about 101° C. to about 103° C., when the vehicle travels at a high speed mode (e.g., greater than a predetermined speed), when the vehicle speed is at least a second predetermined vehicle speed (e.g., about 80 km/h), the engine controller 10 may be configured to generate a cooling fan control signal for adjusting a cooling fan duty ratio, which may be maintained between first predetermined duty ratio (e.g., about 10%) and a fifth predetermined duty ratio (for example, about 50%). In other words, when the engine controller 10 determines that the engine coolant temperature increases from about 101° C. to about 103° C., the engine controller 10 may be configured to generate the cooling fan control signal to adjust the cooling fan duty ratio from the first predetermined duty ratio to the fifth predetermined duty ratio.

Figure 3:
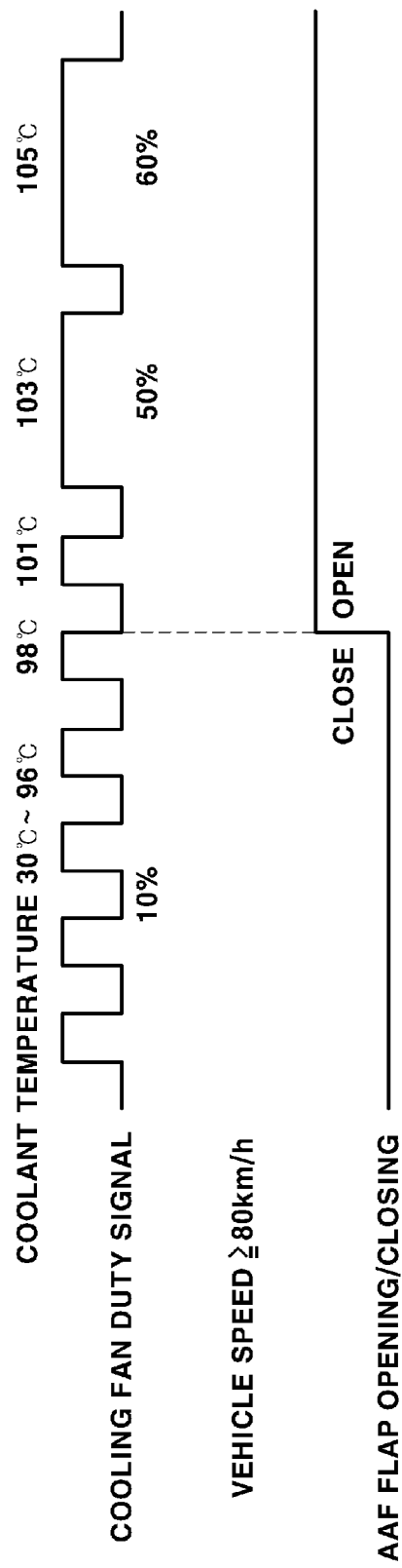

Referring to FIG. 3, when the cooling fan duty ratio is maintained at the first duty ratio (e.g., 10%) and is then adjusted to the fifth predetermined duty ratio (e.g., about 50%), the engine coolant temperature may increase from about 101° C. to about 103° C. In other words, when the engine coolant temperature increases from about 101° C. to about 103° C., the cooling fan duty ratio may be adjusted to the fifth predetermined duty ratio, and the integrated controller 20 may be configured to detect the engine coolant temperature variation. Accordingly, when the integrated controller 20 determines that the vehicle speed is equal to or greater than the second predetermined vehicle speed via a CAN signal, and that the cooling fan control signal uniformly maintains the cooling fan duty ratio at the first predetermined duty ratio and then adjusts the duty ratio to at least the fifth predetermined duty ratio in response to the cooling fan control signal analysis, the integrated controller 20 may be configured to open the radiator flap before the cooling fan duty ratio is adjusted to the fifth predetermined duty ratio.

For example, the integrated controller 20 may be configured to estimate the engine coolant temperature based on the cooling fan control signal (e.g., the cooling fan duty ratio), and may also be configured to open the radiator flap when the engine coolant temperature reaches a first predetermined coolant temperature. The first coolant temperature may be a temperature value that the engine coolant temperature reaches when the cooling fan duty ratio is maintained at about 10%, and also may be a temperature before the cooling fan duty ratio is adjusted to the fifth predetermined duty ratio. The first coolant temperature may be a temperature value less than when the cooling fan duty ratio is adjusted to the fifth predetermined duty ratio, for example, about 98° C., which is lower than 103° C. The fifth predetermined duty ratio may be greater by at least a predetermined value than the first predetermined duty ratio, and may have a value five times greater than the first predetermined duty ratio.

When the air conditioner switch is on, the air conditioner refrigerant pressure is less than a first predetermined pressure (e.g., about 6 kgf/cm$^2$), the vehicle speed is equal to or greater than the first predetermined vehicle speed (e.g., about 45 km/h), and the engine coolant temperature is increased from about 105° C. to about 109° C., the engine controller 10 may be configured to generate the cooling fan control signal to adjust the cooling fan duty ratio, which may be maintained at the first predetermined duty ratio (e.g., about 10%), to a ninth predetermined duty ratio (e.g., about 90%). In other words, when the engine coolant temperature increases from about 105° C. to about 109° C. while the vehicle travels at the first predetermined vehicle speed or greater when an air conditioner disposed within the vehicle is operated, the engine controller 10 may be configured to generate a cooling fan control signal to adjust the cooling fan duty ratio from the first predetermined duty ratio to the ninth predetermined duty ratio.

Figure 4:
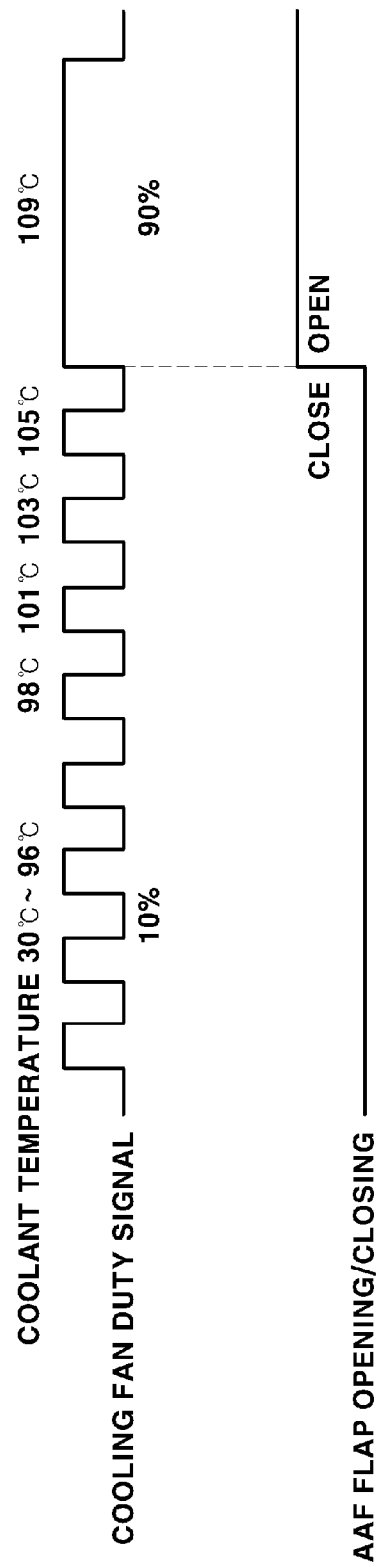

Referring to FIG. 4, when the cooling fan duty ratio is maintained at the first predetermined duty ratio (e.g., about 10%) and is then adjusted to the ninth predetermined duty ratio (e.g., about 90%), the engine coolant temperature may increase from about 105° C. to about 109° C. In other words, when the engine coolant temperature increases from about 105° C. to about 109° C., the cooling fan duty ratio may be adjusted to the ninth predetermined duty ratio, and the integrated controller 20 may be configured to determine the variation of the engine coolant temperature. When the integrated controller 20 determines that the vehicle is traveling at the first predetermined vehicle speed or greater using air conditioning, and that the cooling fan control signal received from the engine controller 10 adjusts the cooling fan duty ratio to the ninth predetermined duty ratio, the integrated controller 20 may be configured to open the radiator flap when the cooling fan duty ratio is adjusted to the ninth duty ratio. The ninth duty ratio may be greater by at least a predetermined value than the first predetermined duty ratio, and may have a value nine times greater than the first predetermined duty ratio.

When the vehicle travels in a low speed mode, when the vehicle speed is less than the first predetermined vehicle speed (e.g., 45 km/h) using air conditioning, when the air conditioner switch 13 is on, the air conditioner refrigerant pressure is equal to or greater than the first predetermined pressure (e.g., about 6 kgf/cm$^2$) and less than a second predetermined pressure (for example, about 15.5 kgf/cm$^2$), and the engine coolant temperature is increased to about 94° C., the engine controller 10 may be configured to generate a cooling fan control signal changing the cooling fan duty ratio. The cooling fan control signal may adjust the duty ratio from the third predetermined duty ratio (e.g., about 30%) to the first predetermined duty ratio (e.g., about 10%), back to the fourth duty ratio (e.g., about 40%). In other words, when the vehicle travels in the low speed mode and =the air conditioner refrigerant pressure is equal to or greater than the first predetermined pressure (e.g., about 6 kgf/cm$^2$) and less than the second predetermined pressure (e.g., about 15.5 kgf/cm$^2$), the engine controller 10 may be configured to generate a cooling fan control signal to adjust the cooling fan duty ratio, which may be maintained at the third predetermined duty ratio, to the first predetermined duty ratio, and then to the fourth predetermined duty ratio when the engine coolant temperature is increased to about 94° C.

Figure 5:
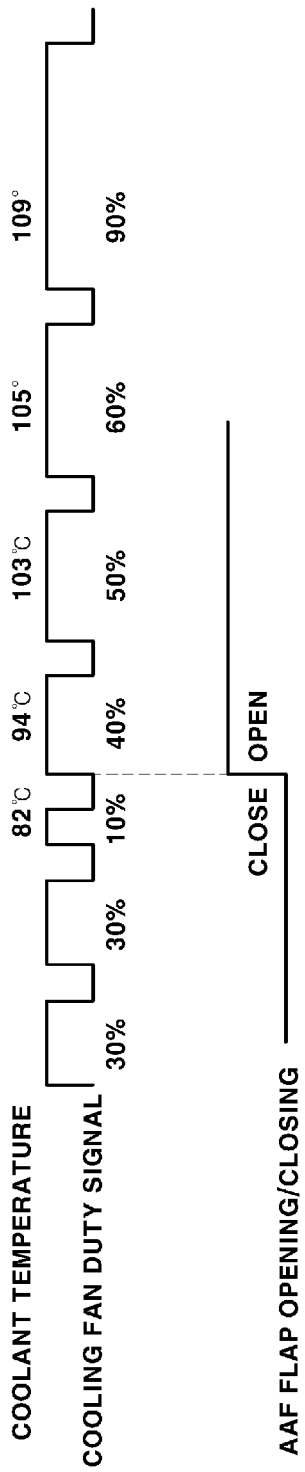

Referring to FIG. 5, the engine coolant temperature may be increased to about 82° C. when the duty ratio of the cooling fan is maintained at the third predetermined duty ratio (e.g., about 30%) and then adjusted to the first predetermined duty ratio (e.g., about 10%). The engine coolant temperature may be increased from about 82° C. to about 94° C. when the cooling fan duty ratio is adjusted from the first predetermined duty ratio to the fourth predetermined duty ratio (e.g., about 40%) again. Furthermore, the engine coolant temperature may be increased to about 103° C. when the cooling fan duty ratio is adjusted from the fourth predetermined duty ratio to the fifth predetermined duty ratio again. In other words, when the engine coolant temperature is increased to about 82° C., the cooling fan duty ratio may be adjusted from the third predetermined duty ration to the first duty ratio.

Further, when the engine coolant temperature is increased from about 82° C. to about 94° C. again, the cooling fan duty ratio may be adjusted from the first predetermined duty ratio to the fourth predetermined duty ratio. Finally, when the engine coolant temperature is increased to about 103° C. again, the cooling fan duty ratio may be adjusted from the fourth predetermined duty ratio to the fifth predetermined duty ratio. Accordingly, when the integrated controller 20 determines that the vehicle travels in the low speed mode via the CAN signal and determines that the cooling fan control signal adjusts the cooling fan duty ratio from the first predetermined duty ratio to the fourth predetermined duty ratio, the integrated controller 20 may be configured to open the radiator flap. The fourth predetermined duty ratio may be greater by at least a predetermined value than the first predetermined duty ratio, and may have a value four times greater than the first predetermined duty ratio.

When the vehicle travels in the low speed mode, when the vehicle speed is equal to or greater than the first predetermined vehicle speed (e.g., about 45 km/h) and less than the second predetermined vehicle speed (e.g., about 80 km/h), with the air conditioner switch 13 is on, the air conditioner refrigerant pressure is equal to or greater than the first predetermined pressure (e.g., about 6 kgf/cm$^2$) and less than the second pressure (e.g., about 15.5 kgf/cm$^2$), and the engine coolant temperature is increased to about 94° C., the engine controller 10 may be configured to generate a cooling fan control signal adjusting the cooling fan duty ratio from the first predetermined duty ratio (e.g., about 10%) to the fourth predetermined duty ratio (e.g., about 40%). In other words, when the vehicle travels in the low speed mode with the air conditioner on under a predetermined condition, the engine controller 10 may be configured to generate a cooling fan control signal, which may maintain the cooling fan duty ratio at the first duty ratio and may adjust the cooling fan duty ratio from the first predetermined duty ratio to the fourth predetermined duty ratio when the engine coolant temperature is increased to about 94° C.

Figure 6:
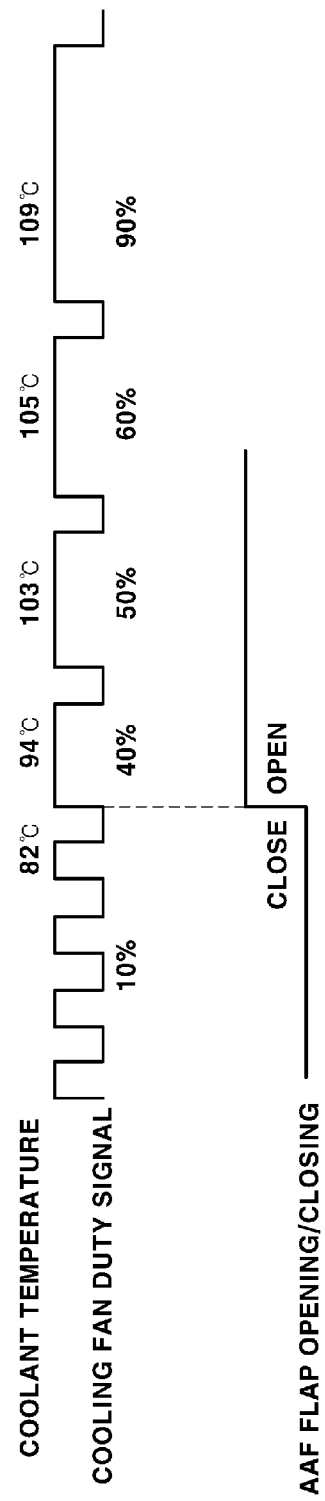

Referring to FIG. 6, when the cooling fan duty ratio is maintained at the first predetermined duty ratio and is then adjusted to the fourth predetermined duty ratio, the engine coolant temperature may increase from about 82° C. to about 94° C. In other words, when the engine coolant temperature is increased from about 82° C. to about 94° C., the cooling fan duty ratio is adjusted from the first predetermined duty ratio to the fourth predetermined duty ratio and the integrated controller 20 may be configured to determine the engine coolant temperature variation. Accordingly, when the integrated controller 20 determines that the vehicle is travelling in the low speed mode and in the air conditioner turned on, and also determines that the cooling fan control signal maintains the cooling fan duty ratio at the first predetermined duty ratio and then adjusts the first predetermined duty ratio to the fourth predetermined duty ratio, the integrated controller 20 may be configured to open the radiator flap.

Further, when the integrated controller 20 determines that the cooling fan duty ratio of the cooling fan is adjusted to the fourth predetermined duty ratio then sequentially adjusted to the fifth predetermined duty ratio, a sixth predetermined duty ratio (e.g., about 60%), and the ninth predetermined duty ratio via the cooling fan control signal, the integrated controller 20 may be configured to continuously maintain an open radiator flap, which may open when the cooling fan duty ratio is adjusted to the fourth predetermined duty ratio. As illustrated in FIG. 6, when the duty ratio of the cooling fan is sequentially adjusted from the fourth predetermined duty ratio (e.g., about 40%), to the fifth predetermined duty ratio (e.g., about 50%), the sixth predetermined duty ratio (e.g., about 60%), and the ninth predetermined duty ratio (e.g., about 90%), the engine coolant temperature may gradually increase from about 94° C. to about 103° C., about 105° C., and about 109° C., respectively.

When the vehicle is in the high speed mode, when the vehicle speed is equal to or greater than the second predetermined vehicle speed (e.g., about 80 km/h) with the air conditioner switch 13 on and the air conditioner refrigerant pressure is equal to or greater than the first predetermined pressure (e.g., about 6 kgf/cm$^2$) and less than the second predetermined pressure (e.g., about 15.5 kgf/cm$^2$), and the engine coolant temperature is increased to about 103° C., the engine controller 10 may be configured to generate a cooling fan control signal adjusting the cooling fan duty ratio, which may be maintained at the first predetermined duty ratio, to the fifth predetermined duty ratio. In other words, when the vehicle travels in the high speed mode and the air conditioner is on under a predetermined condition, the engine controller 10 may be configured to generate a cooling fan control signal, which maintains the cooling fan duty ratio at the first duty ratio, and may be configured to adjust the cooling fan duty ratio from the first predetermined duty ratio to the fifth predetermined duty ratio when the engine coolant temperature increased to about 103° C.

Figure 7:
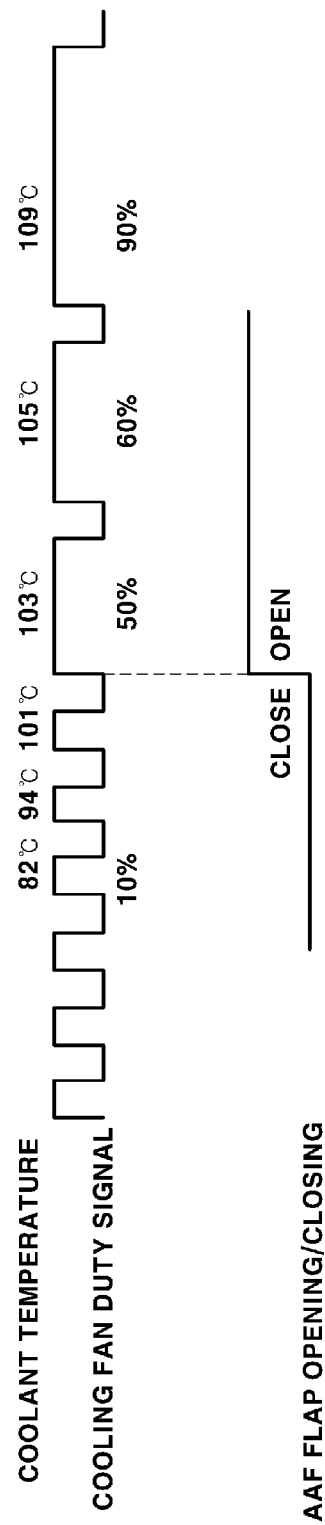

Referring to FIG. 7, when the cooling fan duty ratio is maintained at the first predetermined duty ratio and is adjusted to the fifth predetermined duty ratio, the engine coolant temperature may be increased from about 101° C. to about 103° C. Further, when the cooling fan duty ratio is adjusted from the fifth predetermined duty ratio to the sixth predetermined duty ratio again, the engine coolant temperature may increase from about 103° C. to about 105° C. Additionally, when the cooling fan duty ratio is adjusted from the sixth predetermined duty ratio to the ninth predetermined duty ratio again, the engine coolant temperature may increase from about 105° C. to about 109° C. In other words, when the engine coolant temperature increases from about 101° C. to about 103° C., the cooling fan duty ratio may be maintained at the first predetermined duty ratio and then may be adjusted to the fifth predetermined duty ratio. When the engine coolant temperature increases from about 103° C. to about 105° C. again, the cooling fan duty ratio may be adjusted from the fifth predetermined duty ratio to the sixth predetermined duty ratio. When the engine coolant temperature increases from about 105° C. to about 109° C. again, the duty ratio of the cooling fan may be adjusted from the sixth predetermined duty ratio to the ninth predetermined duty ratio. The integrated controller 20 may be configured to determine the engine coolant temperature variation via the cooling fan control signal.

Accordingly, when the integrated controller 20 determines that the vehicle is travelling in the high speed mode and the air conditioner is on under the predetermined condition, the cooling fan control signal maintains the cooling fan duty ratio at the first duty ratio and then adjusts the duty ratio to the fifth predetermined duty ratio, the integrated controller 20 may be configured to open the radiator flap. The fifth duty ratio may be greater by at least a predetermined value than the first duty ratio, and may have a value five times greater than the first duty ratio. When the integrated controller 20 determines that the cooling fan duty ratio is adjusted to the fifth predetermined duty ratio, and then is sequentially adjusted to the sixth predetermined duty ratio and the ninth predetermined duty ratio via the cooling fan control signal, the integrated controller 20 may be configured to maintain an open radiator flap, which may be opened when the duty ratio of the cooling fan is adjusted to the fifth predetermined duty ratio.

As illustrated in FIG. 7, when the cooling fan duty ratio is sequentially adjusted from the first predetermined duty ratio to the fifth predetermined duty ratio, the sixth predetermined duty ratio, and the ninth predetermined duty ratio, the engine coolant temperature may gradually increase from about 101° C. to about 103° C., about 105° C., and about 109° C., respectively. When the engine coolant temperature increases to about 103° C. and the vehicle is in a safe mode, the engine controller 10 may be configured to generate a cooling fan control signal to adjust the cooling fan duty ratio, which may be maintained at the first predetermined duty ratio, to the fifth predetermined duty ratio. When the vehicle speed of the vehicle is equal to or greater than a third predetermined vehicle speed (e.g., about 180 km/h), the vehicle enters the safe mode. Further, when the vehicle speed is equal to or less than about 170 km/h, the vehicles leaves safe mode.

Figure 8:
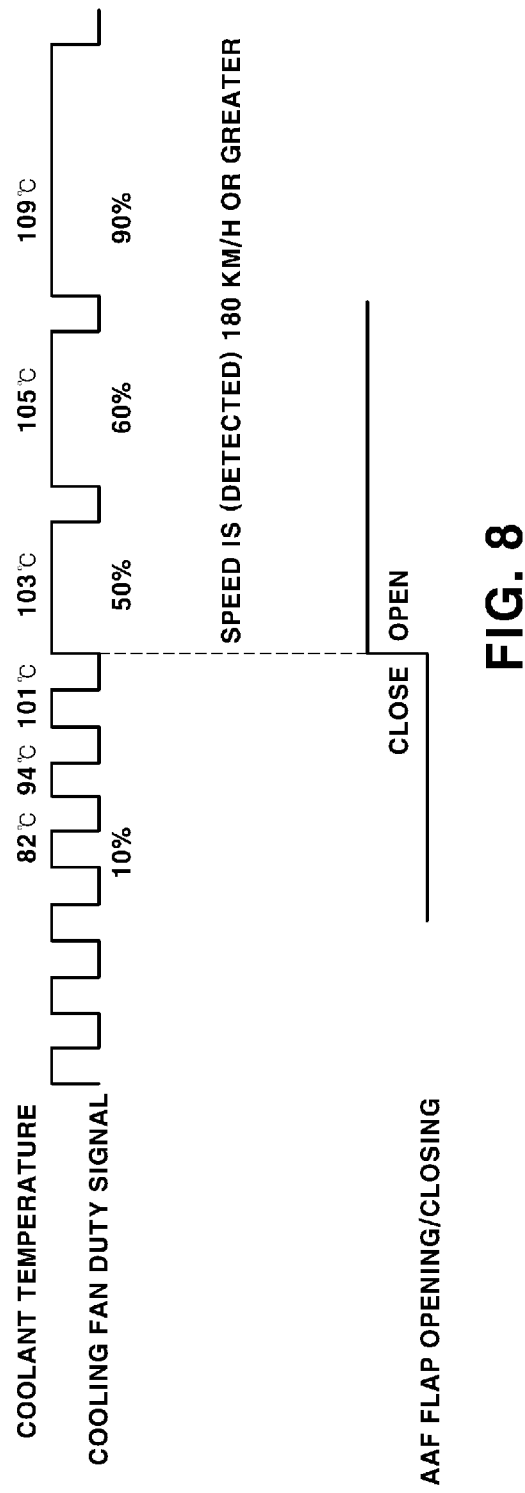

Referring to FIG. 8, in response to the engine coolant temperature increasing from about 101° C. to about 103° C., the cooling fan duty ratio may be maintained at the first predetermined duty ratio and then may be adjusted to the fifth predetermined duty ratio. In other words, the engine coolant temperature may be increased from about 101° C. to about 103° C. when the cooling fan duty ratio is then adjusted from the first predetermined duty ratio to the fifth predetermined duty ratio, and the integrated controller 20 may be configured to determine the engine coolant temperature variation via the cooling fan control signal. When the integrated controller 20 determines that the vehicle enters safe mode and the cooling fan control signal adjusts the cooling fan duty ratio from the first predetermined duty ratio to at least the fifth predetermined duty ratio in response to the cooling fan control signal analysis, the integrated controller 20 may be configured to open the radiator flap when the cooling fan duty ratio is adjusted from the first predetermined duty ratio to the fifth predetermined duty ratio.

Meanwhile, when the integrated controller 20 detects an oil temperature from a transmission controller 30, and determines when the oil temperature of the automatic transmission is greater than a first predetermined oil temperature (or a reference value), and when the oil temperature of the automatic transmission is greater than the first predetermined oil temperature, the integrated controller 20 may be configured to open the radiator flap. Alternatively, when the oil temperature is less than the first predetermined oil temperature, the integrated controller 20 may be configured to close the radiator flap. The transmission controller 30 may be configured to obtain the oil temperature information from an oil temperature sensor 31 and may transmit the obtained oil temperature information to the integrated controller 20 via CAN communication.

When the integrated controller 20 detects engine revolutions per minute (RPM) and engine load information via the CAN communication and determines whether there is an error of an input signal (engine RPM and engine load signal), and when there is no error of the input signal, the integrated controller 20 may be configured to determine when the engine enters a high load region, when an engine RPM is equal to or greater than about 3500 rpm and an engine load is equal to or greater than about 70.2%. Further, the integrated controller may also be configured to determine when the engine exits the high load region, when the engine RPM is less than about 3000 rpm or the engine load is less than about 54.6%. When the vehicle continuously travels with a closed radiator flap when the engine enters the high load region, the engine coolant temperature and a temperature of the main component inside the engine room may increase. Accordingly, when the engine coolant temperature and the temperature of the main component inside the engine room increase to a predetermined value or greater, the integrated controller 20 may be configured to decrease an internal temperature of the engine room by opening the radiator flap.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A system for controlling a radiator flap for a vehicle, comprising:
   an engine controller configured to generate a cooling fan control signal; and
   an integrated controller configured to:
   determine an engine coolant temperature variation based on the cooling fan control signal; and
   determine at least one of a vehicle speed, an air conditioner on/off signal, and an air conditioner refrigerant pressure based on a vehicle control area network (CAN) signal to open and close the radiator flap.

2. The system of claim 1, wherein the engine controller is further configured to:
   generate the cooling fan control signal based on at least one of the vehicle speed, an engine coolant temperature, the air conditioner on/off signal, the air conditioner refrigerant pressure, and an ambient temperature.

3. The system of claim 1, wherein the integrated controller is further configured to operate a cooling fan based on the cooling fan control signal received from the engine controller.

4. The system of claim 1, wherein when the integrated controller is further configured to:
   determine a vehicle speed is less than a first predetermined vehicle speed, the cooling fan control signal received from the engine controller maintains a cooling fan duty ratio at a first predetermined duty ratio and adjusts the cooling fan duty ratio to at least a second predetermined duty ratio; and
   open the radiator flap when the cooling fan duty ratio is adjusted to the second predetermined duty ratio.

5. The system of claim 1, wherein the integrated controller is further configured to:
   determine the vehicle is in a high speed mode when the vehicle speed is equal to or greater than a second predetermined vehicle speed, the cooling fan control signal uniformly maintains a cooling fan duty ratio at a 10% duty ratio and adjusts the cooling fan duty ratio to at least a 50% duty ratio; and
   open the radiator flap before the cooling fan duty ratio is adjusted to the 50% duty ratio.

6. The system of claim 1, wherein in response to an air conditioner switch being on, the air conditioner refrigerant pressure is less than a first predetermined pressure, and the vehicle speed is equal to or greater than a first predetermined vehicle speed, the integrated controller is further configured to:

determine that the cooling fan control signal uniformly maintains a cooling fan duty ratio at a 10% duty ratio and adjusts the cooling fan duty ratio to at least a 90% predetermined duty ratio; and open the radiator flap when the duty ratio of the cooling fan is adjusted to the 90% predetermined duty ratio.

7. The system of claim 1, wherein the integrated controller is further configured to:

determine the vehicle is in a slow speed air conditioner mode and the cooling fan control signal adjusts a cooling fan duty ratio from a 10% duty ratio to at least a 40% duty ratio; and open the radiator flap when the cooling fan duty ratio is adjusted to the 40% duty ratio.

8. The system of claim 1, wherein in response to an air conditioner switch being on, the air conditioner refrigerant pressure is at least a first predetermined pressure and is less than a second predetermined pressure, and the vehicle speed is less than a first predetermined vehicle speed, the integrated controller is further configured to:

determine that the cooling fan control signal maintains a cooling fan duty ratio at a 30% duty ratio and adjusts the cooling fan duty ratio to a 10% duty ratio, and then to at least a 40% duty ratio again; and open the radiator flap when the cooling fan duty ratio is adjusted to the 40% duty ratio.

9. The system of claim 1, wherein in response to an air conditioner switch being on, the air conditioner refrigerant pressure is at least a first predetermined pressure and is less than a second predetermined pressure, and a vehicle speed is equal to or greater than a first predetermined vehicle speed and is equal to or smaller than a second predetermined vehicle speed, the integrated controller is further configured to:

determine that the cooling fan control signal maintains a cooling fan duty ratio at a 10% duty ratio and adjusts the cooling fan duty ratio to at least a 40% duty ratio; and open the radiator flap when the cooling fan duty ratio is adjusted to the 40% duty ratio.

10. The system of claim 1, wherein in response to an air conditioner switch being on, the air conditioner refrigerant pressure is at least a first predetermined pressure and is less than a second predetermined pressure, and the vehicle speed is at least a second predetermined vehicle speed, the integrated controller is further configured to:

determine that the cooling fan control signal maintains a cooling fan duty ratio at a 10% duty ratio and adjusts the cooling fan duty ratio to at least a 50% duty ratio; and open the radiator flap when the cooling fan duty ratio is adjusted to the 50% duty ratio.

11. The system of claim 1, wherein the integrated controller is further configured to:

determine the vehicle enters a safe mode, when the vehicle speed is equal to or greater than a predetermined vehicle speed via the CAN signal;

determine that the cooling fan control signal adjusts a cooling fan duty ration from a 10% duty ratio to at least a 50% duty ratio; and open the radiator flap when the cooling fan duty ratio is adjusted to the 50% duty ratio.

12. A method for controlling a radiator flap for a vehicle, comprising:

receiving, by a controller, a generated cooling fan control signal;

determining, by the controller, an engine coolant temperature based on the generated cooling fan control signal; and determining, by the controller, at least one of a vehicle speed, an air conditioner on/off signal, and an air conditioner refrigerant pressure based on a vehicle control area network (CAN) signal to open and close the radiator flap.

13. The method of claim 12, further comprising operating, by the controller, a cooling fan based on the generated cooling fan control signal.

14. The method of claim 12, further comprising:

determining, by the controller, the vehicle speed is less than a first predetermined vehicle speed, the generated cooling fan control signal received maintains a cooling fan duty ratio at a first predetermined duty ratio and adjusts the cooling fan duty ratio to at least a second predetermined duty ratio; and opening, by the controller, the radiator flap when the cooling fan duty ratio is adjusted to the second predetermined duty ratio.

15. The method of claim 12, further comprising:

determining, by the controller, the vehicle is in a high speed mode when the vehicle speed is equal to or greater than a second predetermined vehicle speed, the generated cooling fan control signal uniformly maintains a cooling fan duty ratio at a 10% duty ratio and adjusts the cooling fan duty ratio to at least a 50% duty ratio; and opening, by the controller, the radiator flap before the cooling fan duty ratio is adjusted to the 50% duty ratio.

16. A non-transitory computer readable medium containing program instructions executed by a controller, the computer readable medium comprising:

program instructions that generate a cooling fan control signal;

program instructions that determine an engine coolant temperature based on the cooling fan control signal; and program instructions that determine at least one of a vehicle speed, an air conditioner on/off signal, and an air conditioner refrigerant pressure based on a vehicle control area network (CAN) signal to open & close a radiator flap.

17. The non-transitory computer readable medium of claim 16, further comprising:

program instructions that generate the cooling fan control signal based on at least one of the vehicle speed, an engine coolant temperature, the air conditioner on/off signal, the air conditioner refrigerant pressure, and an ambient temperature.

18. The non-transitory computer readable medium of claim 16, further comprising:

program instructions that control a cooling fan based on the cooling fan control signal received from an engine controller.

19. The non-transitory computer readable medium of claim 16, further comprising:

program instructions that determine a vehicle speed is less than a first predetermined vehicle speed, the cooling fan control signal received from the engine controller maintains a cooling fan duty ratio at a first predetermined duty ratio and adjusts the cooling fan duty ratio to at least a second predetermined duty ratio; and program instructions that open the radiator flap when the cooling fan duty ratio is adjusted to the second predetermined duty ratio.

20. The non-transitory computer readable medium of claim 16, further comprising:
- program instructions that determine the vehicle is in a high speed mode when the vehicle speed is equal to or greater than a second predetermined vehicle speed, the cooling fan control signal uniformly maintains a cooling fan duty ratio at a 10% duty ratio and adjusts the cooling fan duty ratio to at least a 50% duty ratio; and
- program instructions that open the radiator flap before the cooling fan duty ratio is adjusted to the 50% duty ratio.

\* \* \* \* \*